(12) United States Patent
Ben-Bassat et al.

(10) Patent No.: US 10,346,291 B2
(45) Date of Patent: Jul. 9, 2019

(54) TESTING WEB APPLICATIONS USING CLUSTERS (71) Applicant: International Business Machines Corporation, Armonk, NY (US)

(72) Inventors: Ilan Ben-Bassat, Haifa (IL); Daniel Dubnikov, Savyon (IL); Sagi Kedmi, Raanana (IL); Erez Rokah, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 15/438,527

(22) Filed: Feb. 21, 2017

(65) Prior Publication Data
US 2018/0239693 A1 Aug. 23, 2018

(51) Int. Cl.
*G06F 9/44* (2018.01)
*G06F 11/36* (2006.01)
*H04L 29/08* (2006.01)
*G06F 16/951* (2019.01)

(52) U.S. Cl.
CPC ...... *G06F 11/3676* (2013.01); *G06F 11/3672* (2013.01); *G06F 16/951* (2019.01); *H04L 67/02* (2013.01)

(58) Field of Classification Search
None
See application file for complete search history.

(56) References Cited

U.S. PATENT DOCUMENTS

| | | | |
|---|---|---|---|
| 7,627,613 B1 * | 12/2009 | Dulitz | G06F 17/30864 |
| 7,676,465 B2 | 3/2010 | Poola | |
| 8,136,025 B1 * | 3/2012 | Zhu | G06F 17/30864 |
| | | | 707/634 |
| 8,140,505 B1 | 3/2012 | Jain et al. | |
| 8,738,749 B2 * | 5/2014 | Brock | G06F 21/10 |
| | | | 709/223 |
| 9,734,149 B2 * | 8/2017 | Barouni Ebrahimi | |
| | | | G06F 17/30011 |
| 2003/0061490 A1 * | 3/2003 | Abajian | G06F 17/30038 |
| | | | 713/176 |

(Continued)

FOREIGN PATENT DOCUMENTS

WO 2013009713 A2 1/2013

OTHER PUBLICATIONS

Andrea Stocco, et al.; "Clustering-Aided Page Object Generation for Web Testing"; Jun. 2016, 19 pages. https://www.researchgate.net/publication/296520249_Clustering-Aided_Page_Object_Generation_for_Web_Testing.

(Continued)

*Primary Examiner* — Insun Kang
(74) *Attorney, Agent, or Firm* — Alexander G. Jochym (57) ABSTRACT

An example system includes a processor to crawl a plurality of web pages of a web application to be tested. The processor is also configured to receive an intercepted input to the web application and an output from a web application associated with each crawled web page. The processor is to further configured to detect testable elements in the intercepted input and the output. The processor is also configured to generate a fingerprint for each web page based on the detected testable elements. The processor is also configured to generate a list of clusters comprising one or more similar web pages based on the fingerprints. The processor is configured to test a single web page from each cluster.

14 Claims, 6 Drawing Sheets

(56) References Cited

U.S. PATENT DOCUMENTS

| | | | | |
|---|---|---|---|---|
| 2003/0126151 A1* | 7/2003 | Jung | G06F 17/30917 | |
| 2004/0268303 A1* | 12/2004 | Abe | G06F 8/74 | 717/108 |
| 2005/0060643 A1* | 3/2005 | Glass | G06F 17/241 | 715/205 |
| 2007/0050755 A1* | 3/2007 | Mizrachi | G06F 21/55 | 717/116 |
| 2007/0198635 A1* | 8/2007 | Lindner | G06F 17/30011 | 709/203 |
| 2007/0208703 A1* | 9/2007 | Shi | G06F 17/30864 | |
| 2007/0299869 A1* | 12/2007 | Clary | G06F 11/3452 | |
| 2008/0120305 A1* | 5/2008 | Sima | G06F 17/30864 | |
| 2008/0235163 A1* | 9/2008 | Balasubramanian | G06F 17/30864 | 706/12 |
| 2008/0263026 A1* | 10/2008 | Sasturkar | G06F 17/2211 | |
| 2008/0288509 A1* | 11/2008 | Mysen | G06F 17/30864 | |
| 2008/0289047 A1* | 11/2008 | Benea | G06F 21/64 | 726/27 |
| 2009/0063538 A1* | 3/2009 | Chitrapura | G06F 17/30887 | |
| 2009/0150381 A1* | 6/2009 | Dasdan | G06F 17/30864 | |
| 2009/0157597 A1* | 6/2009 | Tiyyagura | G06F 17/30705 | |
| 2009/0164411 A1* | 6/2009 | Dasdan | G06F 17/30882 | |
| 2009/0164502 A1* | 6/2009 | Dasgupta | G06F 17/30887 | |
| 2010/0064281 A1* | 3/2010 | Kimball | H04L 41/0853 | 717/124 |
| 2010/0169311 A1* | 7/2010 | Tengli | G06F 17/30864 | 707/736 |
| 2010/0242028 A1* | 9/2010 | Weigert | G06F 21/105 | 717/131 |
| 2011/0307436 A1* | 12/2011 | Cai | G06F 17/30625 | 706/48 |
| 2012/0016897 A1* | 1/2012 | Tulumbas | G06F 17/30887 | 707/759 |
| 2012/0284270 A1* | 11/2012 | Lee | G06F 17/30011 | 707/737 |
| 2014/0207743 A1* | 7/2014 | Quinn | G06F 3/0608 | 707/692 |
| 2015/0067839 A1* | 3/2015 | Wardman | G01F 11/263 | 726/22 |
| 2016/0048849 A1* | 2/2016 | Shiftan | G06F 17/30247 | 705/7.29 |
| 2016/0092591 A1* | 3/2016 | Barouni Ebrahimi | G06F 17/30011 | 707/709 |
| 2016/0117347 A1* | 4/2016 | Nielsen | G06F 17/30256 | 707/738 |
| 2016/0283229 A1* | 9/2016 | Rogers | G06F 8/751 | |
| 2016/0335333 A1* | 11/2016 | Desineni | G06F 17/30156 | |
| 2017/0257383 A1* | 9/2017 | Ficarra | H04L 63/1408 | |
| 2018/0011919 A1* | 1/2018 | Warren | G06F 17/30011 | |

OTHER PUBLICATIONS

Gurmeet Singh Manku, et al.; "Detecting Near Duplicates for Web Crawling"; WWW 2007 / Track: Data Mining, 9 pages. http://www2007.cpsc.ucalgary.ca/papers/paper215.pdf.

* cited by examiner

TESTING WEB APPLICATIONS USING CLUSTERS

BACKGROUND

The present techniques relate to testing web applications. More specifically, the techniques relate to testing web applications using clusters.

SUMMARY

In a particular implementation described herein, a system can include a processor, configured by code executing therein, to crawl (traverse and/or parse the contents of) a plurality of web pages of a web application to be tested. The suitably configured processor can also further receive an intercepted input to the web application and an output from the web application associated with each crawled web page. The suitably configured processor can also detect testable elements in the intercepted input and the output. The processor can also generate a fingerprint for each web page based on the detected testable elements. The suitably configured processor can further generate a list of clusters comprising one or more similar web pages based on the fingerprints. The suitably configured processor can also further test a single web page from each cluster.

A further implementation described herein, is directed to a method that includes crawling, via a processor configured by code executing therein, a plurality of web pages of a web application to be tested. The method also includes receiving, via the processor, an intercepted input to the web application and an output from the web application associated with each crawled web page. The method can also include detecting, via the processor, testable elements in the intercepted input and the output. The method can further include generating, via the processor, a fingerprint for each web page based on the detected testable elements. The method can also include generating, via the processor, a list of clusters comprising one or more similar web pages based on the fingerprints. The method can also further include testing, via the processor, a single web page from each cluster.

According to another embodiment described herein, a computer program product for testing web applications can include computer-readable storage medium having program code embodied therewith. The computer readable storage medium is not a transitory signal per se. The program code is executable by a processor to cause the processor to crawl a plurality of web pages of a web application to be tested. The program code can also cause the processor to receive an intercepted input to the web application and an output from the web application associated with each crawled web page. The program code can also cause the processor to detect testable elements in the intercepted input and the output. The program code can also cause the processor to generate a fingerprint for each web page based on the detected testable elements. The program code can also cause the processor to also further generate a list of clusters comprising one or more similar web pages based on the fingerprints. The program code can also cause the processor to test a single web page from each cluster.

2

DETAILED DESCRIPTION

Dynamic web application testers can test web applications by crawling web applications in their entirety and testing all the elements of each web application. For example, dynamic testing of web applications may include two phases: crawling and testing. One objective of the crawling phase is to identify all testable elements in a web application. For example, the testable element may include parameters, cookie values, etc. In the testing phase, one role of the dynamic web application tester is to attack testable elements and validate tests on the testable elements. However, such dynamic web scanning may not be able to scan large web applications due to the vast number of web pages to crawl, and the amount of testable elements per page combined with the physical constraints of machines.

In one implementation, a suitably configured processor tests web applications using clusters. For example, the processor is configured to crawl a plurality of web pages of a web application to be tested. The processor receives an intercepted input to a web application and an output from the web application associated with each crawled web page. In a non-limiting implementation, the input includes a Hypertext Transfer Protocol (HTTP) request and the output includes a HTTP response. The suitably configured processor is further configured to detect testable elements in the intercepted input and the output. In one arrangement, the processor generates a fingerprint for each web page based on the detected testable elements. The processor then generates a list of clusters comprising one or more similar web pages based on the fingerprints. Here, the processor tests a single web page from each cluster. For example, since each cluster may have been created by the same server-side application functionality, only one page from each cluster is tested. Thus, the present techniques are able to reduce the number of web pages to be tested and increase the efficiency of the dynamic web application tester. In some experiments, the number of web pages needed to be tested could be reduced 10-20 times and still achieve an equivalent level of coverage. In a non-limiting implementation, the present techniques further increase efficiency of the testing procedure by predicting which requests would result in additional web pages in a cluster that would be redundant for purposes of testing. For example, the processor generates a maximal distance between requests for each cluster in the list of clusters and detect that the request would not result in a web page that belongs to any cluster based on the maximal distances for the clusters. Thus, the techniques may enable additional efficiency for a web application tester once a list of clusters has been generated. Furthermore, in some examples, the processor is further configured to detect a security vulnerability based on the testing and modify the web application to prevent the security vulnerability. For example, the processor removes characters from user input that result in the execution of unauthorized scripts.

In some scenarios, the techniques described herein are implemented in a cloud computing environment. As discussed in more detail below in reference to at least FIGS. 4, 5, and 6, a computing device configured to test web applications using clusters are implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that is rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but is able to specify location at a higher level of abstraction (e.g., country, state, or datacenter).

Rapid elasticity: capabilities is rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It is managed by the organization or a third party and may be located on-premises or off-premises.

Community cloud: the cloud infrastructure is shared by several organizations and supports a specific community that has shared concerns (e.g., mission, security requirements, policy, and compliance considerations). It is managed by the organizations or a third party and exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
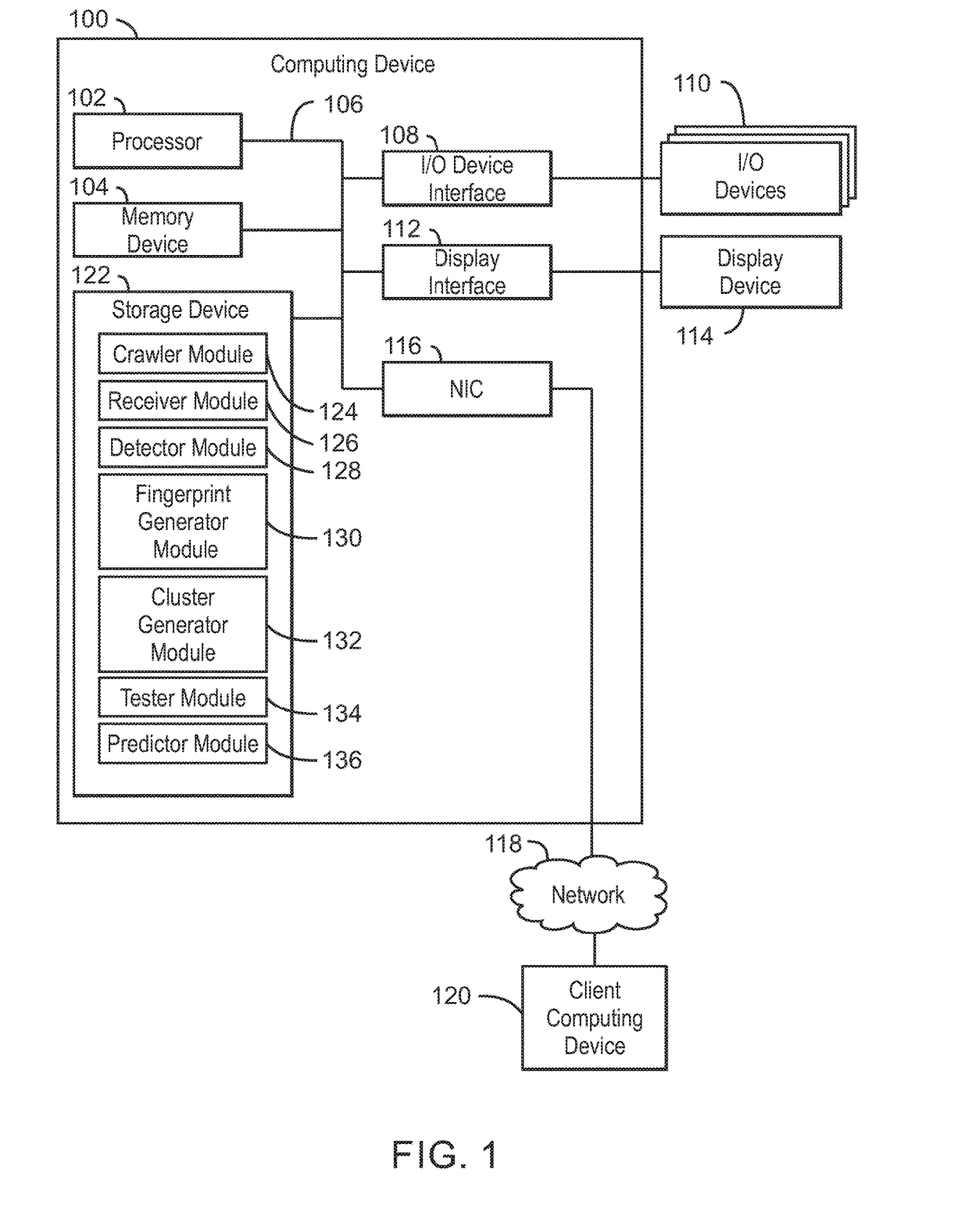
FIG. 1 is a block diagram of an example system that can test web applications using clusters.

With reference now to FIG. 1, an example computing device can test web applications using clusters. The computing device 100 is for example, a server, a network device, desktop computer, laptop computer, tablet computer, or smartphone. In some examples, computing device 100 is a cloud computing node. Computing device 100 is described in the general context of computer system executable instructions, such as program modules, being executed by a computer system. Generally, program modules may include routines, programs, objects, components, logic, data structures, and so on that perform particular tasks or implement particular abstract data types. Computing device 100 is practiced in distributed cloud computing environments where tasks are performed by remote processing devices that are linked through a communications network. In a distributed cloud computing environment, program modules are located in both local and remote computer system storage media including memory storage devices.

The computing device 100 may include a processor 102 configured to execute stored instructions, a memory device 104 to provide temporary memory space for operations of said instructions during operation. The processor can be a single-core processor, multi-core processor, collection of single core or multi-core processors, computing cluster, or any number of other configurations. The memory 104 can include random access memory (RAM), read only memory, flash memory, EPROMs, or any other suitable memory systems.

The processor 102 are connected through a system interconnect 106 (e.g., PCI®, PCI-Express®, etc.) to an input/ output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 are built-in components of the computing device 100. Alternatively, the I/O devices 110 are devices that are externally connected to the computing device 100.

The processor 102 is, in one implementation, linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 are adapted to connect the computing device 100 through the system interconnect 106 to the network 118. In some embodiments, the NIC 116 can transmit data using any suitable interface or protocol, such as the internet small computer system interface, among others. The network 118 are a cellular network, a radio network, a wide area network (WAN), a local area network (LAN), or the Internet, among others. An external computing device 120 may connect to the computing device 100 through the network 118. In some examples, external computing device 120 is an external webserver 120. In some examples, external computing device 120 is a cloud computing node.

The processor 102 is, in one implementation, linked through the system interconnect 106 to a storage device 122 that can include a hard drive, an optical drive, a USB flash drive, an array of drives, or any combinations thereof. In some examples, the storage device may include a crawler module 124, a receiver module 126, a detector module 128, a fingerprint generator module 130, a cluster generator module 132, a tester module 134, and a predictor module 136. In some examples, one or more of the modules 124-136 are implemented as an application or a web browser plugin. The crawler module 124 configures the processor to crawls a plurality of web pages of a web application to be tested. For example, given one or more seed uniform resource locators (URLs), the crawler module 124 downloads the web pages associated with the URLs, extract any hyperlinks contained in the URLs, and adds the hyperlinks to a list of URLs to visit, (also known as a 'crawl frontier').

URLs from the crawl frontier are then recursively visited according to the crawler's policy. The receiver module 126 can then receive an intercepted input to a web application and an output from the web application associated with each crawled web page. For example, the input may include an HTTP request and the output may include an HTTP response. In some examples, the input may include a GET parameter and the output may include a document object model. For example, the document object model is a tree structure of a web page. The detector module 128 configures the processor to detect testable elements in the intercepted input and the output. The fingerprint generator module 130 also configures the processor to generate a fingerprint for each web page based on the detected testable elements. For example, the fingerprint for each web page may include a plurality of response element fingerprints and a plurality of request element fingerprints. For example, the response element fingerprints may include concatenated fingerprints of a number of extracted response elements in a response. The request element fingerprints may include concatenated fingerprints of a number of extracted request elements in a request. In some examples, the fingerprint generator 130 configures the processor to calculate a similarity score between the fingerprint for each web pages and each cluster in the list of clusters based on a calculated hamming distance. The cluster generator module 132 configures the processor to generate a list of clusters comprising one or more similar web pages based on the fingerprints. For example, the cluster generator 132 configures the processor to calculate a similarity score between a fingerprint for a web page from the plurality of web pages and a cluster from the list of clusters. The cluster generator 132 then configures the processor to add the web page to the cluster in response to detecting that the similarity score exceeds a similarity threshold. In some examples, the cluster generator module 132 configures the processor to calculate a similarity score between the fingerprint for each web page and each cluster in the list of clusters based on a calculated hamming distance or any other suitable linear block code technique. In some examples, the cluster generator module 132 configures the processor to calculate a hamming distance for a fingerprint of a web page and a cluster by detecting the number of positions in two compared fingerprints at which corresponding symbols are different. For example, the hamming distance may indicate the number of substitutions to be made to change one fingerprint into the other. The tester module 134 configures the processor to test a single web page from each cluster. Thus, the tester module 134 configures the processor to efficiently test web applications by testing a single web page from each cluster and not every web page, while maintaining testing coverage.

In some examples, the predictor module 136 configures the processor to generate a maximal distance between requests for each cluster in the list of clusters. In some examples, the predictor module 136 configures the processor to receive a request to be sent to the web application. The predictor module 136 configures the processor to then detect that the request would not result in a web page that belongs to any cluster based on the maximal distances for the clusters. In some examples, the crawler module 124 configures the processor to send the request to a web application in response to detecting that the request would not result in the web page that belongs to any cluster. In some examples, the crawler module 124 configures the processor to not send the request to a web application in response to detecting that the request would result in the web page that belongs to a cluster. Thus, the predictor module 136 enables the crawler module 124 to configure the processor to perform more efficiently by sending a reduced number of requests and enable the receiver module 126 to cause the processor to perform more efficiently by not receiving web pages that would not be used in testing.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the crawler module 124, the receiver module 126, the detector module 128, the fingerprint generator module 130, the cluster generator module 132, the tester module 134, and the predictor module 136, are partially, or entirely, implemented in hardware and/or in the processor 102. For example, the functionality described herein is implemented with an application specific integrated circuit, logic implemented in an embedded controller, or in logic implemented in the processor 102, among others. In some embodiments, the functionalities of the crawler module 124, the receiver module 126, the detector module 128, the fingerprint generator module 130, the cluster generator module 132, the tester module 134, and the predictor module 136, are implemented with logic, wherein the logic, as referred to herein, can include any suitable hardware (e.g., a processor, among others), software (e.g., an application, among others), firmware, or any suitable combination of hardware, software, and firmware.

Figure 2:
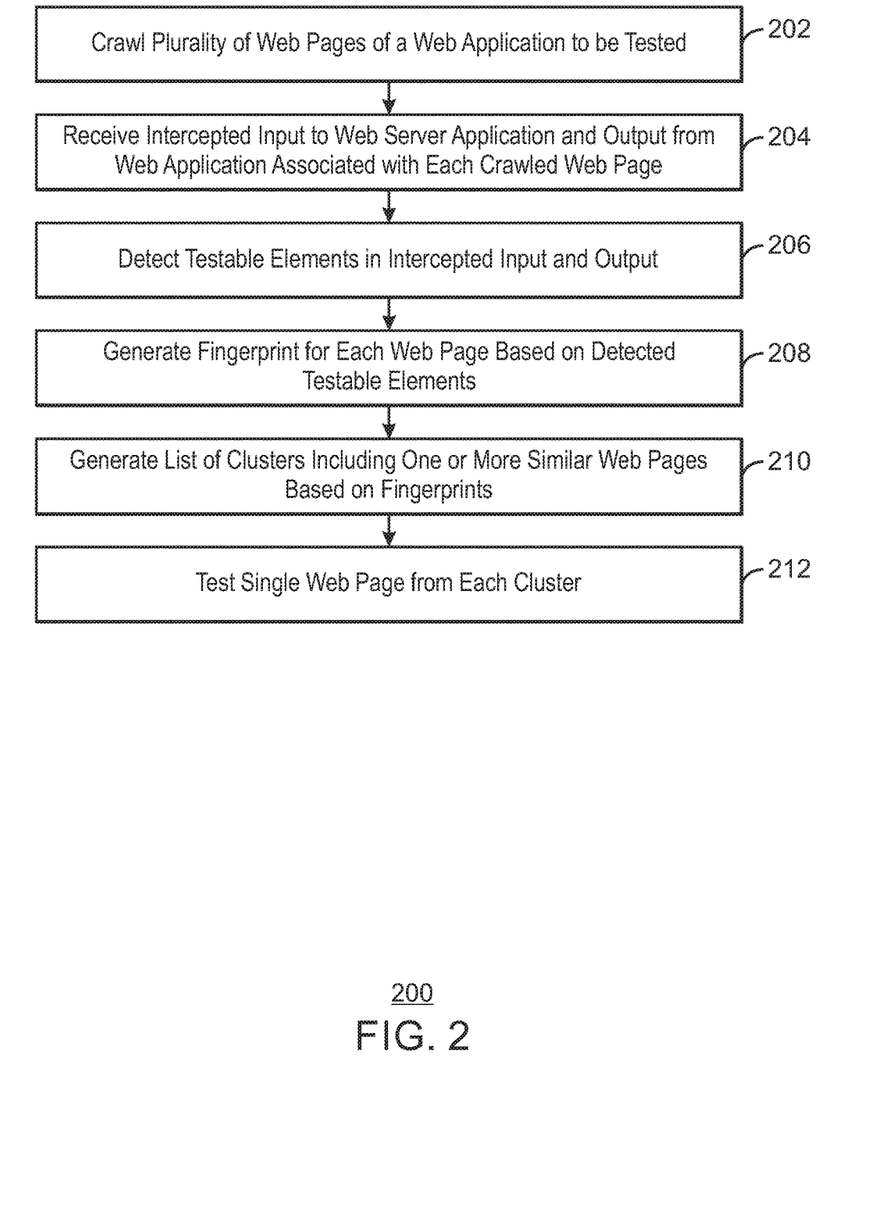
FIG. 2 is an information flow diagram of an example method for testing applications pages using clusters.

FIG. 2 is a process flow diagram of an exemplary method for testing applications pages using clusters. The method 200 is implemented with any suitable computing device, such as the computing device 100 of FIG. 1. For example, the method is implemented via the processor 102 of computing device 100.

At block 202, a suitably configured processor crawls a plurality of web pages of a web application to be tested. For example, the web pages of the web application are recursively visited according to a crawling policy. In some examples, the crawling policy is an instruction set, rule or selection policy that identifies the pages to be downloaded. For example, a selection policy is a focused crawling policy that looks for similarity of web pages to a given query. In some examples, a selection policy is a URL normalization policy that tries to normalize a URL to avoid redundant crawling. In some examples, the crawling policy is a parallelization policy that uses many crawlers in parallel to increase crawling efficiency. For example, the parallelization policy can state how to coordinate a plurality of distributed web crawlers.

At block 204, the processor receives an intercepted input to the web application and an output from a web application associated with each crawled web page. For example, the intercepted input is a HTTP request. In some examples, the output is an HTTP response. In some examples, the processor can intercept input to a web application, send the input to the web application if the input would not result in a web page that belongs to any cluster based on the maximal distances calculated for list of clusters, and receive an output from the web application in response to the input.

At block 206, the processor detects testable elements in the intercepted input and the output. For example, testable elements in the input can include schemes, ports, parameters, cookies, headers, etc. In some examples, the testable elements in the output can include document object model (DOM) elements of HTTP responses.

At block 208, the processor generates a fingerprint for each web page based on the detected testable elements. For example, the processor can generate a fingerprint for each element in a request resulting in the web page and a fingerprint for each element in the web page and combine the fingerprints for the elements to generate the fingerprint for each web page. In some examples, the fingerprint for a web page is generated using a dictionary or vector that counts the number of occurrences of testable elements in the requests and responses of a web page. For example, the processor may count the number of query or body parameters in the request. In some examples, the processor can count the number of specific HTML elements in the response. Thus, the fingerprint is based on a concatenation of both the fingerprints generated for input elements and fingerprints generated for output elements.

At block 210, the processor generates a list of clusters comprising one or more similar web pages based on the fingerprints. For example, the clusters may represent web pages with similar server-side functionality. In some examples, the web pages in a cluster are the output of the same server-side functionality or script. In some examples, the processor may take two of the fingerprints and calculate a similarity based on an average of the ratios of each of the testable elements. In some examples, the processor can calculate a similarity score between a fingerprint for a web page from the plurality of web pages and a cluster from the list of clusters and add the web page to the cluster in response to detecting that the similarity score exceeds a similarity threshold. In some examples, the processor can calculate a similarity score between the fingerprint for each web pages and each cluster in the list of clusters based on a calculated hamming distance. For example, the hamming distance may indicate number of positions in two compared fingerprints at which corresponding symbols are different. In some examples, the processor can calculate a similarity score by calculating min-wise independent permutations (MinHash). For example, MinHash are used to calculate the ratio of the number of elements of an intersection between two fingerprints and the number of elements of their union without explicitly computing the intersection and the union. In some examples, the processor may calculate a similarity score using a SimHash hashing function. For example, similar elements are hashed to similar hash values having low hamming distances.

At block 212, the processor tests a single web page from each cluster. For example, since each cluster is believed to have been created by the same server side functionality, only one page from each cluster is tested. In some examples, the processor can then detect a security vulnerability based on the testing and modify the web application to prevent the security vulnerability. For example, the processor may remove characters from user input that can result in the execution of unauthorized scripts. In some examples, if security vulnerabilities are detected from the single page tested, the processor is configured to modify the web application to affect each of the pages of the cluster and prevent the security vulnerability.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
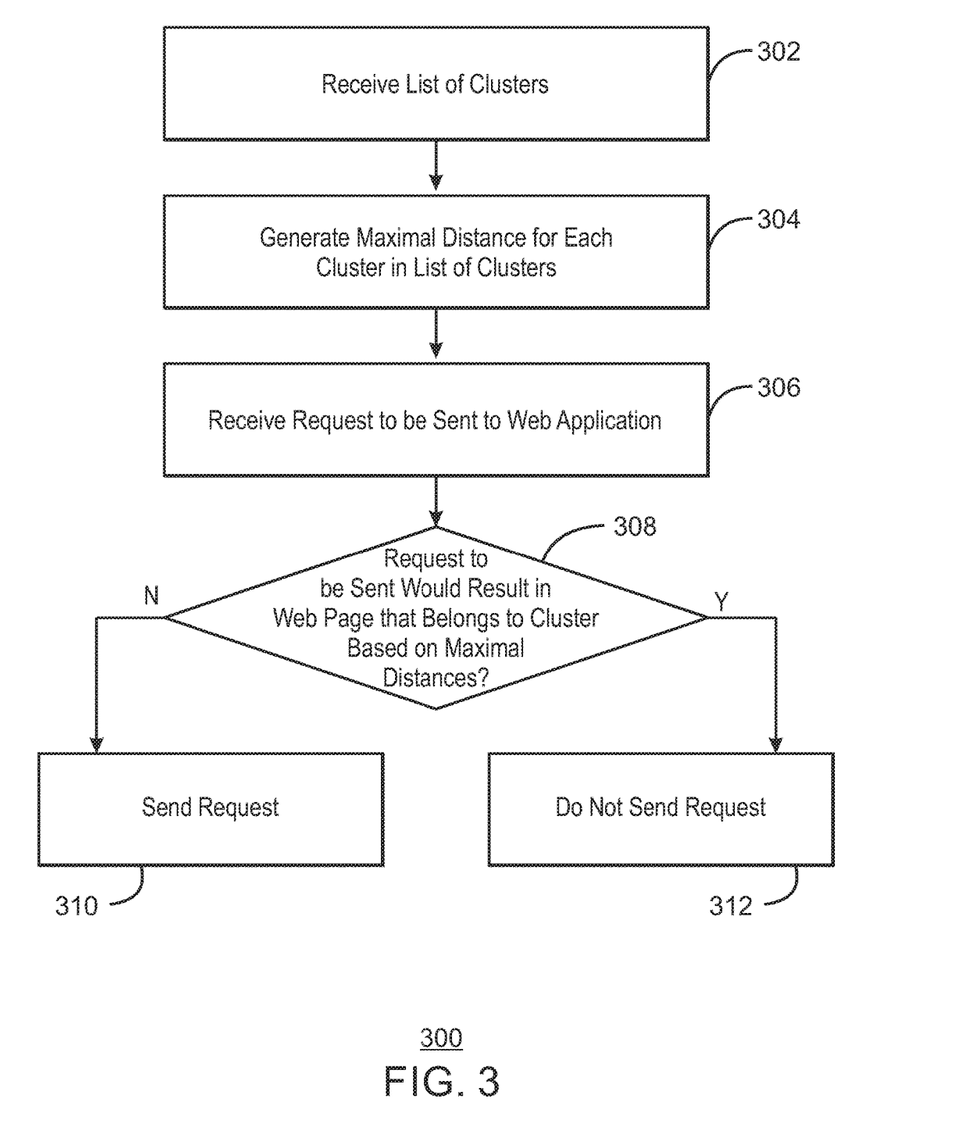
FIG. 3 is a process flow diagram of an example method for testing web applications using cluster predictions.

FIG. 3 is a process flow diagram of an example method for testing web applications using cluster predictions. The method 300 is implemented with any suitable computing device, such as the computing device 100 of FIG. 1. For example, the method is implemented via the processor 102 of computing device 100.

At block 302, the processor receives a list of clusters. For example, the list of clusters may have been generated using the method 200 above.

At block 304, the processor generates a maximal distance for each cluster in the list of clusters. For example, the processor can generate a maximal distance between requests for a cluster by calculating similarity scores between requests resulting in the web pages in the cluster. The maximal distance is a similarity score that is lower than other similarity scores in the cluster. In some examples, the similarity scores are calculated using any suitable form of hamming distance. In some examples, the maximal distance between requests in a cluster is stored as a variable of the cluster. Thus, for every web-page that is inserted into the cluster, the processor can consider the request that preceded the web page, and iteratively compute the similarity between the request and other requests in the cluster. For example, a similarity score is calculated using any suitable variation of a hamming distance. In some examples, the hamming distance is performed on a portion of the request, rather than every part of the request.

At block 306, the processor receives a request to be sent to a web application. For example, the request sent are a textual representation of a request that may have been intercepted before reaching the web application. In some examples, the request is sent to the target web application in a test environment. For example, the request to be sent is generated from a received test input. In some examples, the request is generated automatically. In one implementation, a suitably configured processor may generate the request by parsing previous responses and extracting new links. In some examples, the request is given directly. For example, the processor is configured to receive starting URLs, also known as seeds, and generate the request based on the received starting URLs. In some examples, the request is generated by intercepting data from a client to the web application. For example, processor may intercept the data at a browser.

With respect to decision diamond 308, the processor is configured to determine whether the request to be sent would result in a web page that belongs to a cluster based on the maximal distances. For example, if the request is within the maximal distance of a cluster then the processor detects whether the request would result in a web page that would belong to the cluster. If the request would not result in a web page that belongs to a cluster, then the method advances to the step provided in block 310. If the request would result in a web page that belongs to a cluster, then the method advances to the step provided in block 312.

At block 310, a suitably processor sends the request. For example, the processor may send the request to a target web application. Here, the requests are sent to the web application in a testing environment. The processor may then receive a response that is processed according to the step outlined at element 200 of FIG. 2 above.

At block 312, the processor refrains from sending the request. For example, since the request may not return any useful web page for testing, both the resources used to send the request and the resources used to receive the web page are used for other processing. Thus, the processor is able to efficiently test the web application by reducing the number of web pages to be clustered.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
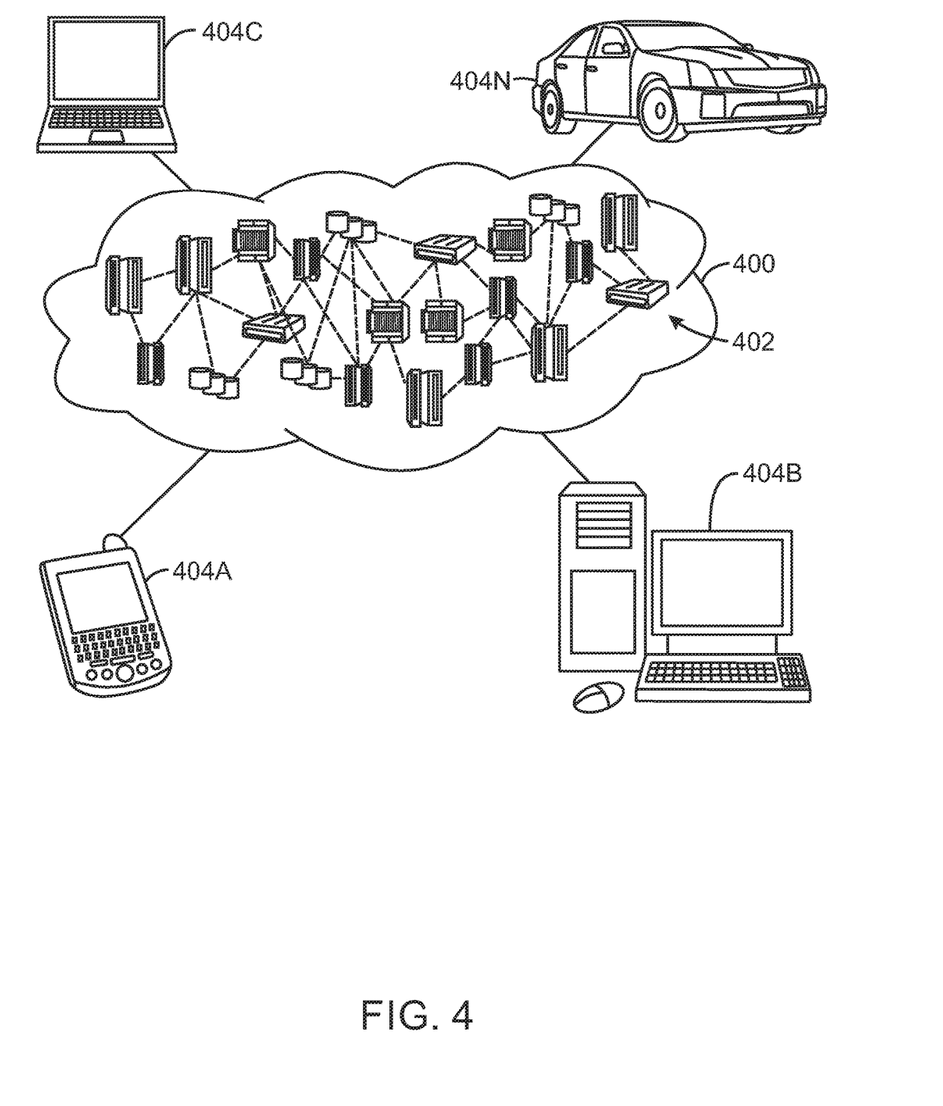
FIG. 4 is a block diagram of an example cloud computing environment according to embodiments described herein.

Referring now to FIG. 4, an illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. Here, the cloud computing elements are grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
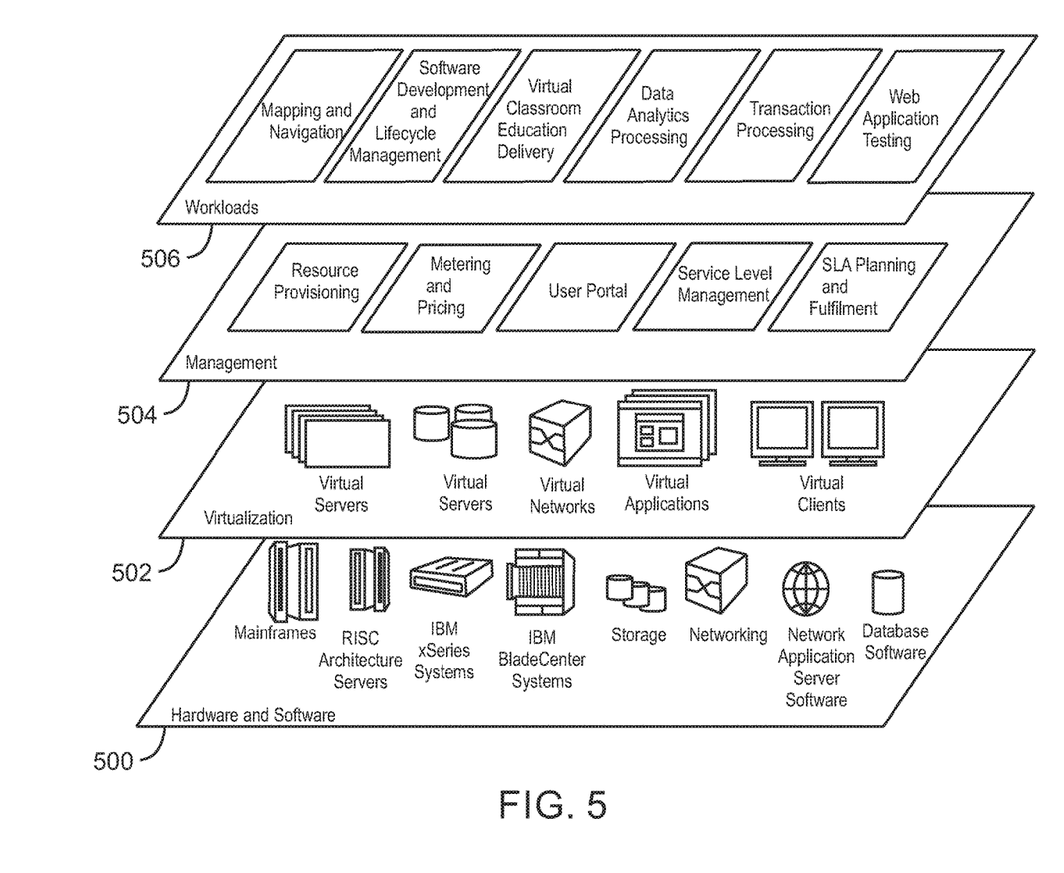
FIG. 5 is an example abstraction model layers according to embodiments described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, such as but not limited to IBM® zSeries® systems; RISC (Reduced Instruction Set Computer) architecture based servers, such as but not limited to IBM pSeries® systems; IBM xSeries® systems; IBM BladeCenter® systems; storage devices; networks and networking components. Examples of software components include network application server software, such as but not limited to IBM WebSphere® application server software; and database software, such as but not limited to IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities are provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. By way of overview, metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 506 provides examples of functionality for which the cloud computing environment are utilized. Examples of workloads and functions which are provided from this layer include: mapping and navigation; software development and lifecycle management; virtual classroom education delivery; data analytics processing; transaction processing; and web application testing.

The present techniques include a system, a method or computer program product. The computer program product may include a computer readable storage medium (or media) having computer readable program instructions thereon for causing a processor to carry out aspects of the present invention.

The computer readable storage medium is a tangible device that can retain and store instructions for use by an instruction execution device. The computer readable storage medium are, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions described herein are, in one implementation, downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer is connected to the user's computer through any type of network, including a local area network (LAN) or a wide area network (WAN), or the connection are made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, is, in one implementation, implemented by computer readable program instructions.

In an non-limiting example, the computer readable program instructions are provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions is, in one implementation, stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions is, in one implementation, loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
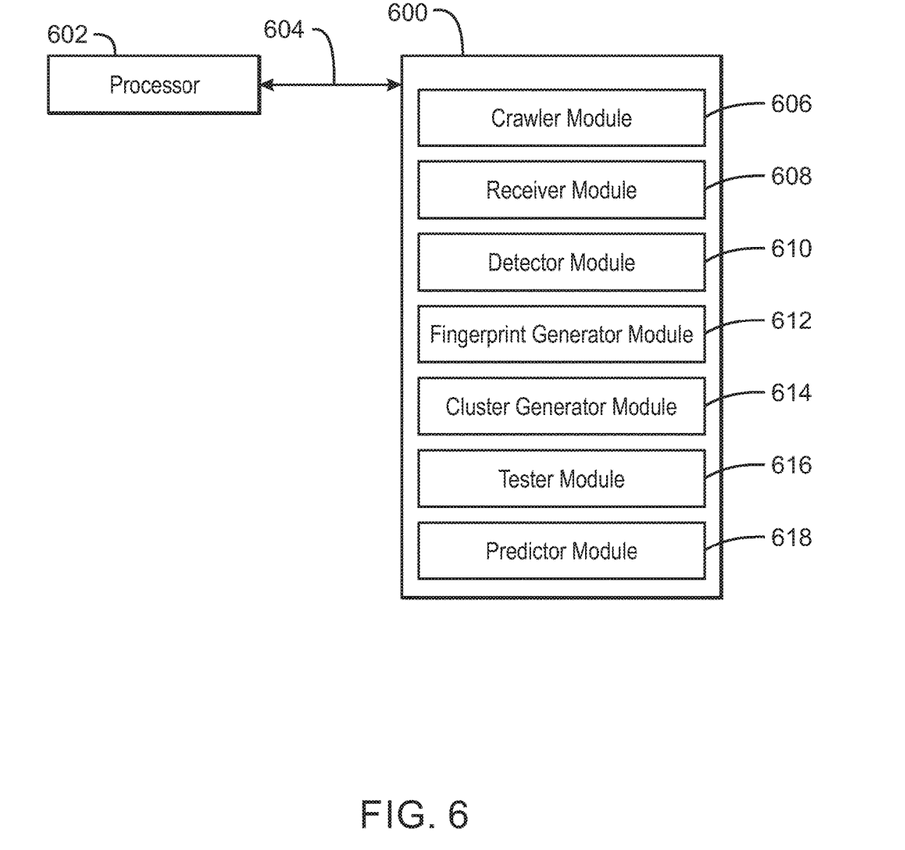
FIG. 6 is an example tangible, non-transitory computer-readable medium that can test web applications using clusters.

FIG. 6 provides a block diagram depicting an example of a tangible, non-transitory computer-readable medium 600 that can test web applications using clusters. The tangible, non-transitory, computer-readable medium 600 is in one implementation, accessed by a processor 602 over a computer interconnect 604. Furthermore, the tangible, non-transitory, computer-readable medium 600 may include code to direct the processor 602 to perform the operations of the methods 200 and 300 of FIGS. 2 and 3 above.

In a non-limiting example, the various software components discussed herein are stored on the tangible, non-transitory, computer-readable medium 600, as indicated in FIG. 6. For example, a crawler module 606 includes code to crawl a plurality of web pages of a web application to be tested. A receiver module 608 includes code to configure the processor to receive an intercepted input to the web application and an output from a web application associated with each crawled web page. For example, the input may include an HTTP request or a GET parameter and the output may include an HTTP response or a document object model. A detector module 610 includes code to configure the processor to detect testable elements in the intercepted input and the output. A fingerprint generator module 612 includes code to configure the processor to generate a fingerprint for each web page based on the detected testable elements. For example, the fingerprint generator module 612 can include code instructing the processor to generate a fingerprint for each element in a request resulting in the web page and a fingerprint for each element in the web page. The fingerprint generator module 612 also includes code instructing the processor to combine the fingerprints for the elements to generate the fingerprint for each web page. A cluster generator module 614 includes code instructing the processor to generate a list of clusters including one or more similar web pages based on the fingerprints. For example, the cluster generator module 614 can include code instructing the processor to calculate a similarity score between a fingerprint for a web page from the plurality of web pages and a cluster from the list of clusters and add the web page to the cluster in response to detecting that the similarity score exceeds a similarity threshold. In some examples, the cluster generator module 614 can include code instructing the processor to calculate a similarity score between the fingerprint for each web pages and each cluster in the list of clusters based on a calculated hamming distance. A tester module 616 includes code instructing the processor to test a single web page from each cluster. A predictor module 618 includes code to generate a maximal distance between requests for each cluster in the list of clusters. In some examples, the predictor module 618 can include instructing the processor to code to generate a maximal distance between requests for a cluster by calculating similarity scores between requests resulting in the web pages in the cluster. For example, the maximal distance is a similarity score that is lower than the other similarity scores. The predictor module 618 can also include code instructing the processor to receive a request to be sent to the web application. The predictor module 618 can include code instructing the processor to detect that the request would not result in a web page that belongs to any cluster based on the maximal distances for the clusters. The crawler module 606 can configures the processor to send the request in response to detecting that the request would not result in the web page that belongs to any cluster. Thus, the predictor module 618 configures the processor to utilize the crawler module 606 to operate more efficiently by reducing unnecessary requests from being sent and also prevent unnecessary web pages from being received at the receiver module 608. It is to be understood that any number of additional software components not shown in FIG. 6 are included within the tangible, non-transitory, computer-readable medium 600, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, is implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

All references cited herein, if any, are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the points that follow, the respective features recited in those points, and by equivalents of such features.

What is claimed is:

1. A system, comprising:
   a memory; and
   a processor coupled to the memory configured with code to:
   receive a list of web page clusters, each of the web page clusters representing a grouping of a plurality of web pages of a web application to be tested, where each web page cluster includes an associated input maximal distance score generated by calculating the similarity of each of one or more web page requests that resulted in a web page associated with a given web page cluster of the web page clusters, the maximal distance score is lower than other similarity scores in a cluster of the list;

receive an intercepted input to the web application, where the input is configured to cause the web application to provide a responsive web page as an output for the input;

obtain a similarity score between the input and one or more web page requests;

cause the input to be sent to the web application as a request input where the similarity score between the input and any one of the one or more web page requests is less than the maximal distance score of the given web cluster;

receive the output for the input from the web application;

detect testable elements in the input and output;

generate a combined fingerprint for the input and output based on the detected testable elements from the input and output by counting the number of occurrences of the detected testable elements in the input and output, wherein fingerprints generated for input elements of the input and fingerprints generated for output elements of the output are concatenated;

add the output to one cluster of the list of web page clusters based on similarity between the combined fingerprint and the one cluster; and test a single web page from each cluster of the list of web page clusters.

2. The system of claim 1, wherein the input comprises a hypertext transfer protocol (HTTP) request and the output comprises a hypertext transfer protocol (HTTP) response.

3. The system of claim 1, wherein the test of the single web page from each cluster includes the processor being further configured to detect a security vulnerability based on the intercepted input; and modify the web application to prevent the detected security vulnerability in each web page in each web page cluster.

4. The system of claim 1, wherein the processor is configured to calculate a similarity score between a fingerprint for a respective web page from the plurality of web pages and a respective cluster from the list of clusters and add the respective web page to the respective cluster in response to detecting that the similarity score exceeds a similarity threshold.

5. The system of claim 1, wherein the processor is configured to calculate a similarity score between the fingerprint and each cluster in the list of clusters based on a calculated hamming distance.

6. A computer-implemented method, carried out by one or more processors executing with code, comprising the steps of:

receiving a list of web page clusters, each of the web page clusters representing a grouping of a plurality of web pages of a web application to be tested, where each web page cluster includes an associated input maximal distance score generated by calculating the similarity of each of one or more web page requests that resulted in a web page associated with a given web page cluster of the web page clusters, the maximal distance score is lower than other similarity scores in a cluster of the list;

receiving, via a processor, an intercepted hypertext transfer protocol (HTTP) request to the web application where the request is configured to cause the web application to provide a hypertext transfer protocol (HTTP) response from the web application;

obtaining a similarity score between the HTTP request and one or more web page requests;

causing the intercepted HTTP request to be sent to the web application as a request input where the similarity score between the HTTP request and any one of the one or more web page requests is less than the maximal distance score of the given web cluster;

receiving the HTTP response for the HTTP request from the web application;

detecting, via a processor, testable elements in the received request and response;

generating, via a processor, a combined fingerprint for each web page based on a first fingerprint generated from the detected testable elements from the intercepted request and a second fingerprint generated from the detected testable elements of the response by counting the number of occurrences of the detected testable elements in the HTTP request and response, wherein fingerprints generated for input elements of the HTTP request and fingerprints generated for output elements of the HTTP response are concatenated;

adding, via a processor, the HTTP response to one cluster of the list of web page clusters based on similarity between the combined fingerprint and the one cluster; and testing, via a processor, a single web page from each cluster of the list of web page clusters.

7. The computer-implemented method of claim 6, further comprising the steps of:

calculating, via the processor, a similarity score between the combined fingerprint for a web page from the plurality of web pages and a cluster from the list of clusters; and adding the web page to the cluster in response to detecting that the similarity score exceeds a similarity threshold.

8. The computer-implemented method of claim 6, further comprising the step of calculating, via a processor, a similarity score between the fingerprint and each cluster in the list of clusters based on a calculated hamming distance.

9. The computer-implemented method of claim 6, wherein the step of generating the combined fingerprint for each web page comprises the steps of: generating a first fingerprint representing each element in a GET request and a second fingerprint for each element of a document object model returned as a response to the GET request; and combining the first and second fingerprints for the elements to generate the combined fingerprint for each web page.

10. The computer-implemented method of claim 6, further comprising steps of: sending the HTTP request to the web application if the HTTP request would not result in a web page that belongs to any cluster based on maximal distances calculated for the list of clusters, and receiving an output from the web application in response to the HTTP request.

11. A computer program product for testing web applications, the computer program product comprising a computer-readable storage medium having program code embodied therewith, wherein the computer readable storage medium is not a transitory signal per se and the program code is executable by one or more processors to:

receive a list of web page clusters, each of the web page clusters representing a grouping of a plurality of web pages of a web application to be tested, where each web page cluster includes an associated input maximal distance score generated by calculating the similarity of each of one or more web page requests that resulted in a web page associated with a given web page cluster of the web page clusters, the maximal distance score is lower than other similarity scores in a cluster of the list;

receive an intercepted input to the web application, where the input is configured to cause the web application to provide a responsive web page as an output for the input;

obtain a similarity score between the input and one or more web page requests;

cause the input to be sent to the web application as a request input where the similarity score between the input and any one of the one or more web page requests is less than the maximal distance score of the given web cluster;

receive the output for the input from the web application;

detect testable elements in the input and output;

generate a combined fingerprint for each web page based on a first fingerprint of the detected testable elements from the intercepted input and the second fingerprint of the detected testable element from the output by counting the number of occurrences of the detected testable elements in the input and output, wherein fingerprints generated for input elements of the input and fingerprints generated for output elements of the output are concatenated;

add the output to one cluster of the list of web page clusters comprising one or more similar web pages based on similarity between the combined fingerprint and the one cluster; and test a single web page from each cluster of the list of web page clusters.

12. The computer program product of claim 11, further comprising program code executable by a processor to calculate a similarity score between a fingerprint for a web page from the plurality of web pages and a cluster from the list of clusters and to add the web page to the cluster in response to detecting that the similarity score exceeds a similarity threshold.

13. The computer program product of claim 11, further comprising program code executable by a processor to calculate a similarity score between the fingerprint for each web page and each cluster in the list of clusters based on a calculated hamming distance.

14. The computer program product of claim 11, further comprising program code, executable by a processor to:
   generate a maximal distance between requests for each cluster in the list of clusters;
   receive a request to be sent to the web application;
   detect that the request would not result in a web page that belongs to any cluster based on the maximal distances for the clusters; and
   send the request in response to detection that the request would not result in the web page that belongs to any cluster.

* * * * *